United States Patent
Eastman, II

(10) Patent No.: US 6,918,465 B2
(45) Date of Patent: Jul. 19, 2005

(54) OUTDOOR SEAT CUSHION FOR USE WITH AN ELEVATED WILD GAME OBSERVATION STAND, AND OBSERVATION STAND INCLUDING SAME

(76) Inventor: Robert Eastman, II, c/o Eastman Outdoors, Inc., 3476 Eastman Dr., Flint, MI (US) 48433

(*) Notice: Subject to any disclaimer, the term of this patent is extended or adjusted under 35 U.S.C. 154(b) by 0 days.

(21) Appl. No.: 10/656,688

(22) Filed: Sep. 5, 2003

(65) Prior Publication Data

US 2004/0040787 A1 Mar. 4, 2004

Related U.S. Application Data

(63) Continuation of application No. 10/091,434, filed on Mar. 6, 2002, now abandoned.

(51) Int. Cl.[7] .......................... E04G 3/00; A47C 27/08; A47C 20/02; A47C 31/00; A47C 7/02
(52) U.S. Cl. .......................... 182/187; 182/135; 5/707; 5/654; 297/217.7; 297/452.27; 297/DIG. 1
(58) Field of Search ................................. 182/187, 188, 182/135, 136, 116, 20; 297/452.27, 452.21, 452.26, 452.41, DIG. 3, DIG. 1, 452.2, 199, 200, 217.7, 277.1

(56) References Cited

U.S. PATENT DOCUMENTS

| | | |
|---|---|---|
| 3,564,628 A * | 2/1971 | Oxford ........................... 5/707 |
| 4,782,918 A | 11/1988 | Brunner et al. |
| 5,009,283 A | 4/1991 | Prejean |
| 5,103,935 A | 4/1992 | Amacker |
| 5,113,540 A | 5/1992 | Sereboff |
| 5,167,298 A | 12/1992 | Porter |
| 5,191,665 A | 3/1993 | Breedlove |
| 5,226,505 A | 7/1993 | Woller et al. |
| 5,234,076 A | 8/1993 | Louk et al. |
| 5,722,729 A * | 3/1998 | Carilli .................... 297/452.55 |
| 5,845,352 A | 12/1998 | Matsler et al. |
| 5,927,575 A | 7/1999 | Gatling |
| 5,937,969 A | 8/1999 | Woller et al. |
| 5,979,603 A | 11/1999 | Woller |
| 6,050,067 A | 4/2000 | Knight et al. |
| 6,209,159 B1 * | 4/2001 | Murphy ........................ 5/654 |

* cited by examiner

Primary Examiner—Hugh B. Thompson, II
(74) Attorney, Agent, or Firm—Carrier, Blackman & Associates, P.C.; William D. Blackman; Joseph P. Carrier

(57) ABSTRACT

A seat cushion, for use with an elevated outdoor hunting or observation stand, is constructed with a plurality of layers therein. The seat cushion is constructed in two or more layers in which one layer includes an envelope with a gas sealed therein. The envelope may include at least two independently sealed chambers. A second layer of the seat cushion includes a flexible foam pad above the envelope. The seat cushion may further include a reinforcing member below the envelope, which may be made of foam which is denser than the foam of the top foam layer. A portable tree seat apparatus is also described, including a frame, an attachment member for cooperating with the frame to attach the frame to a tree, and the multi-layer seat cushion.

15 Claims, 4 Drawing Sheets

OUTDOOR SEAT CUSHION FOR USE WITH AN ELEVATED WILD GAME OBSERVATION STAND, AND OBSERVATION STAND INCLUDING SAME

CROSS-REFERENCE TO RELATED APPLICATIONS

The present application is a continuation of U.S. patent application Ser. No. 10/091,434, filed Mar. 6, 2002 now abandoned.

BACKGROUND OF THE INVENTION

1. Field of the Invention

The present invention relates to a seat cushion for a tree seat, and to a tree seat incorporating the described seat cushion. More particularly, the present invention relates to a seat cushion having multiple stacked layers, including an envelope with a gas sealed therein, and to a tree seat apparatus incorporating the layered seat cushion.

2. Description of the Background Art

A number of different tree seats and tree stands are known, and are commercially available. Many tree seats are classified in class 182, subclass 187. Examples of some of the known tree seats and tree stands include U.S. Pat. No. 4,782,918 to Brunner et al., U.S. Pat. No. 5,009,283 to Prejean, U.S. Pat. No. 5,103,935 to Amacker, U.S. Pat. No. 5,167,298 to Porter, U.S. Pat. No. 5,226,505 to Woller, U.S. Pat. No. 5,234,076 to Louk et al, U.S. Pat. No. 5,937,969 to Woller, and U.S. Pat. No. 5,979,603 to Woller.

A tree seat having an inflatable seat cushion with a manual valve for inflation and deflation thereof has been sold by the Deer Shack Company of Belgium, Wis. under the trademark "BUNSAVER", and this product is advertised at various sites on the Internet. However, since this product is not factory sealed, but instead, has a built-in valve to allow for inflation and deflation of the cushion by a user, it is possible that the valve could accidentally pop open during use, which could be inconvenient and uncomfortable for a user thereof.

Although the known tree seats are useful for their intended purposes, a need still exists in the art for an improved tree seat cushion, and for a tree seat apparatus which provides a comfortable seating cushion for a hunter. In particular, there is a need for an improved tree seat cushion and for a tree seat apparatus which incorporates a chamber having a gas sealed permanently therein, to minimize the possibility that it will unintentionally deflate.

SUMMARY OF THE INVENTION

The present invention provides a portable multi-layered cushion for use with a tree seat apparatus, as well as a tree seat apparatus incorporating the multi-layer seat cushion, for use by hunters and naturalists.

In one illustrative embodiment of the present invention, a seat cushion for use with a tree seat apparatus includes a sealed envelope containing an entrapped gas. The sealed envelope may contain two or more separate chambers.

The seat cushion according to the selected embodiment also includes a layer of flexible, resilient foam above the sealed envelope and defining a top foam layer.

The seat cushion according to the selected embodiment further includes a reinforcing member below the sealed envelope, the reinforcing member including a material which is denser than the foam of the top foam layer. The reinforcing member may be made from a resilient closed-cell foam.

The seat cushion according to the selected embodiment still further includes a protective outer layer covering the sealed envelope, the top foam layer, and the reinforcing member.

The outer layer may be made from a fabric material and optionally, may include a water-resistant liner.

A portable tree seat apparatus according to the invention, generally, includes a frame, an attachment member for cooperating with the frame to attach the tree seat apparatus to a tree, and a seat cushion which is operatively attached to an upper portion of the frame.

In a first embodiment of the invention, the frame includes at least one connector bar for substantially vertical placement against a tree trunk. The frame also includes a foot rest operatively attached to the connector bar, and a seat support, which is operatively attached to the connector bar and spaced away from the foot rest.

The attachment member may include a substantially V-shaped bar for cooperatively engaging the frame to surround a tree trunk, or alternatively, may include a belt which may be tightened around a tree trunk.

The internal structure of the seat cushion is an important aspect of the tree seat apparatus. The seat cushion includes an pillow including at least one sealed envelope containing an entrapped gas. Optionally, the sealed envelope may have a flexibly resilient foam material disposed therein, with an inert gas interspersed through and around the foam material. The pillow is preferred to include at least two separate chambers which are independent of one another.

The seat cushion may further include a reinforcing member below the pillow; and a protective outer layer covering the pillow and the reinforcing member. A flexibly resilient foam pad may be provided above the pillow, and within the protective outer layer.

Where used, the seat cushion outer layer is preferred to include a fabric material, and may also be provided with an optional water-resistant liner.

Accordingly, it is an object of the present invention to provide a seat cushion for use with a tree seat apparatus, in which the seat cushion includes a permanently sealed envelope, in which the envelope contains a gas.

It is another object of the invention to provide seat cushion for a tree seat apparatus of the type described, wherein the sealed envelope includes at least two separate and independent chambers.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENTS

Overview

Figure 1:
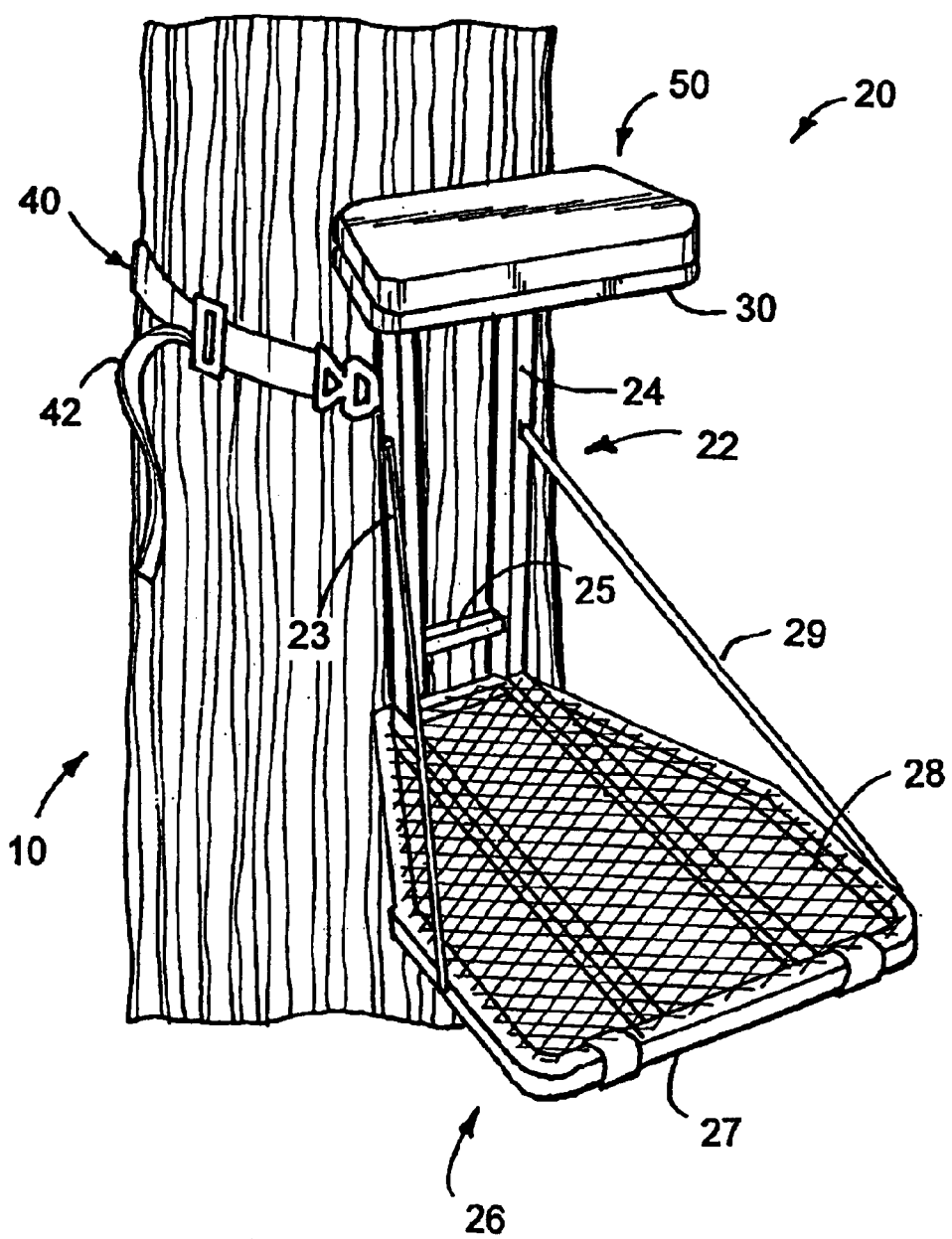
FIG. 1 is a perspective view of a tree seat apparatus according to a first embodiment of the present invention, attached to a tree trunk.

Referring now to FIG. 1, a tree seat apparatus is shown generally at 20, attached to a tree trunk 10. The tree seat apparatus 20 includes a seat cushion 50 according to a selected illustrative embodiment of the invention.

In one embodiment, the invention provides a multi-layered seat cushion 50 for use outdoors in connection with a tree seat apparatus 20.

In another embodiment, the invention provides a tree seat apparatus 20 including a comfortable multi-layered seat cushion 50. Each of these embodiments will be further discussed herein.

The portable tree seat apparatus 20 of FIG. 1 includes a frame 22, an attachment member 40 for cooperating with the frame 22 to attach the tree seat apparatus 10 to a tree, and a seat cushion 50, which is operatively attached to the frame. Each of the components of the apparatus will be described in further detail herein.

Throughout the present specification, relative positional terms like 'upper', 'lower', 'top', 'bottom', 'horizontal', 'vertical', and the like are used to refer to the orientation of the apparatus as shown in the drawings. These terms are used in an illustrative sense to describe the depicted embodiments, and are not meant to be limitative. It will be understood that the depicted apparatus may be placed at an orientation different from that shown in the drawings, such as inverted 180 degrees or transverse to that shown, and in such a case, the above-identified relative positional terms will no longer be accurate.

The Frame

As noted, a tree seat apparatus 20 according to the embodiment shown in FIG. 1 includes a frame 22. In a first embodiment of the tree seat apparatus 20, and as illustrated in FIG. 1, the frame 22 includes at least one connector bar, such as that shown at 23, for substantially vertical placement against a tree trunk 10. It is preferred that the frame 22 include two spaced apart connector bars 23, 24 as shown. The connector bars 23, 24 may be interconnected by a crossbar 25, as shown, or by multiple crossbars, as desired. Alternatively, a flat plate (not shown) could be used to interconnect the two connector bars 23, 24.

The frame 22 also includes a foot rest 26 operatively attached to the connector bar 23, proximate the lower end thereof. The foot rest 26 is preferred to be pivotally attached to the bottom end of the connector bar 23, so as to be foldably movable with respect thereto. The foot rest 26 may be a solid or perforate member.

In the depicted embodiment, the foot rest 26 includes a support rack 27 and a screen 28 attached to the top surface of the support rack. Other configurations could be used for the foot rest, such as a solid or perforated flat metal or plastic plate.

One or more chains or flexible suspension cables, such as the cable shown at 29, may, optionally, be provided to interconnect the foot rest 26 and the connector bar(s) 23, 24.

The frame 22 further includes a seat support 30. The seat support 30 is operatively attached to the top section of the connector bars 23, 25 and is spaced away from the foot rest 26. The seat support 30 is formed from strong, rigid materials such as metal, composites, high-strength plastics, or a combination of these. The seat support 30 may have a construction similar to that of the foot rest 26, as previously described.

Optionally, the seat support 30 may also be pivotally and adjustably attached to the connector bars 23, 25 to make the apparatus foldable when not in use. However, where so attached, it is important to include some means for fixing the position of the seat support in a substantially horizontal orientation, so that it will safely support the full weight of a user thereon, for an extended time period.

The Attachment Member

The attachment member 40 is provided to cooperate with the frame 22, to temporarily and removably attach the tree seat apparatus 20 to a tree 10. In the embodiment of FIG. 1, the attachment member 40 is provided in the form of an adjustable strap 42. Where used, this strap 42 is formed from a high-strength woven fabric material, and includes conventional hardware such as a buckle and attachment connectors. The attachment member 40 could also be provided as a chain or cable (not shown).

Alternatively, the attachment member 40 may be provided in the form of a substantially V-shaped or U-shaped metal tube or rod for interlocking attachment to the frame, substantially similar to that disclosed in U.S. Pat. No. 5,979,603. The disclosure of U.S. Pat. No. 5,979,603 is incorporated by reference herein.

The Seat Cushion

The seat cushion 50 is provided to make the apparatus 20 more comfortable for a user during prolonged periods of use.

As noted, the present invention contemplates the multi-layered seat cushion 50 as one embodiment thereof, provided for outdoor use with a tree seat 20.

The seat cushion 50 is attached to the seat support 30 by any appropriate known method, such as sewing, removable straps, etc. The embodiment of the seat cushion 50 depicted in FIGS. 2–3 includes an pillow 52, a reinforcing member 54 below the pillow, a foam pad 58 above the pillow, and a protective outer cover 60.

The seat cushion 50 according to the invention includes a pillow 52 having a gas sealed therein. The gas in the pillow 52 may be air, or may be another substantially inert gas such as argon, nitrogen, or the like, or a mixture of any of the above gases.

Figure 2:
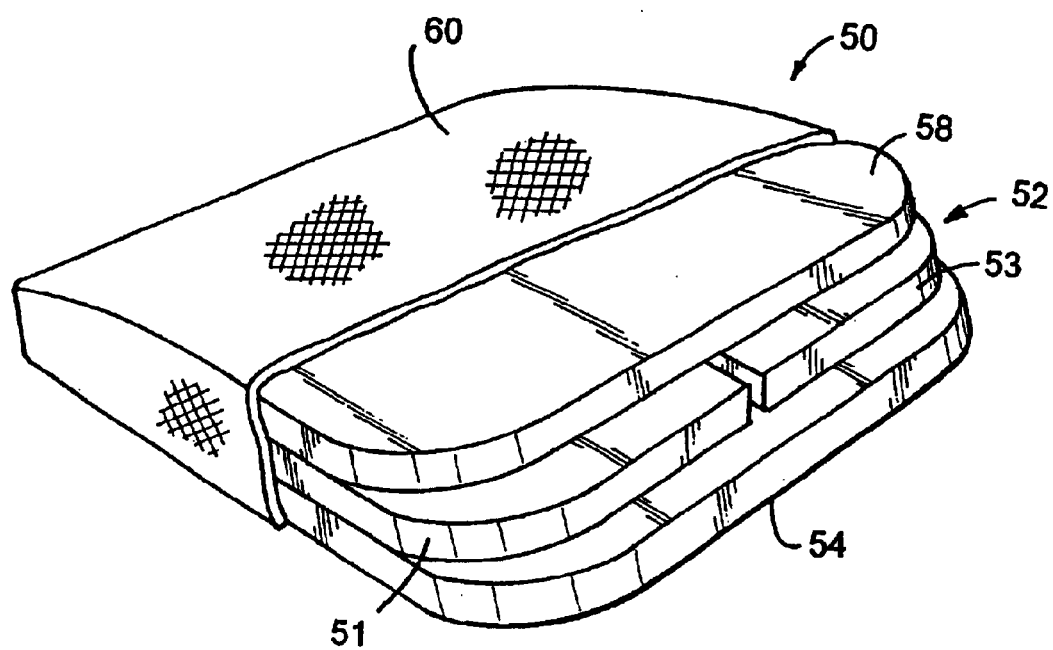
FIG. 2 is a perspective view, partially cut away, of a seat cushion according to an illustrative embodiment of the invention.

In the embodiment of FIGS. 2–3, the pillow 52 includes at least two separate and independent sealed envelopes 51, 53, each containing an entrapped gas therein. The envelopes 51, 53 are each preferably formed of a strong, flexible plastic or elastomeric material, and should be of suitable wall thickness so as to remain sealed over a period of years in normal usage. In the practice of the present invention, the envelopes 51, 53 do not contain any valves to add or remove gas from the interior thereof. Preferably, the envelope wall thickness is in a range from 0.5–2 mm.

Figure 3A:
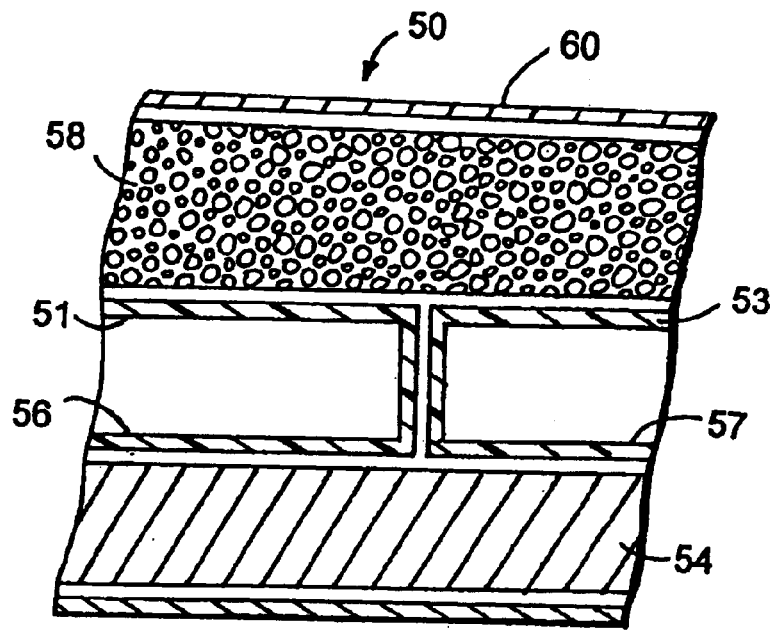
FIG. 3A is a cross-section of a first embodiment of the cushion of FIG. 2.

Each of the envelopes 51, 53 defines a respective chamber 56, 57 therein. In the embodiment of FIG. 3A, each of the respective chambers 56, 57 contains only a substantially inert gas, at a pressure which is close to atmospheric pressure. The pillow 52 is preferred to include at least two separate chambers, which are independent of one another.

Figure 3B:
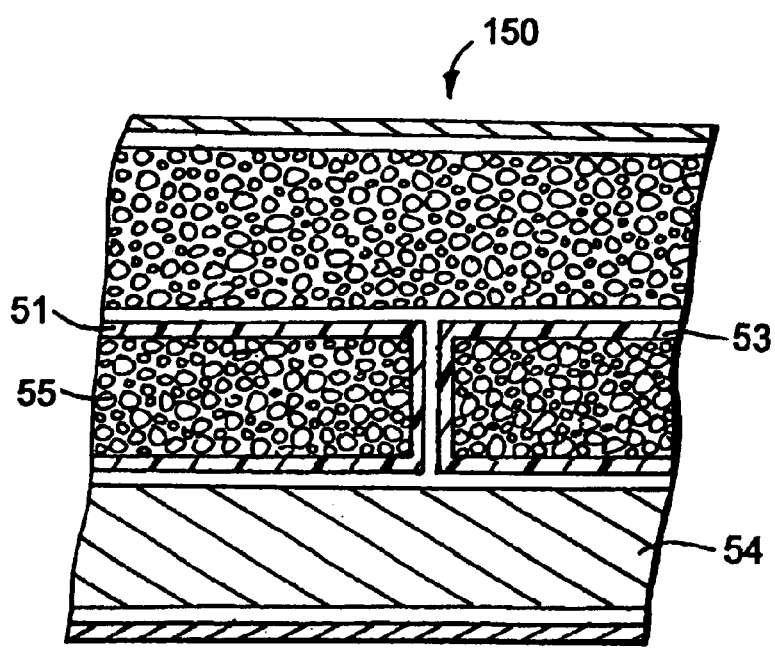
FIG. 3B is a cross-section of a second embodiment of the cushion of FIG. 2.

Optionally, and as shown at 150 in FIG. 3B, the sealed envelopes 51, 53 may have a flexibly resilient foam material 55 disposed therein, along with a substantially inert gas interspersed around and through the foam material.

Preferably but not necessarily, the seat cushion 50 includes a flexibly resilient foam pad 58 disposed above the pillow 52 and defining a top foam layer to provide further support for a user thereof. Where used, the foam pad 58 may be formed of foam rubber or elastomeric materials known in the seating art.

The seat cushion 52 may also include a reinforcing member 54 below the pillow 52, to provide reinforcement and structural support. Where used, the reinforcing member 54 may be made of solid plastic, wood, a plastic or elastomeric foam, or other material which is denser than the foam material of the top layer.

The seat cushion 52 may further include a protective outer layer 60 covering the pillow 52, the reinforcing member 54, and the foam pad 58, where used. The outer layer 60 may be a plastic sleeve, or may be made of a durable fabric material. Optionally, the outer layer 60 may be provided with a water-resistant liner.

Figure 4:
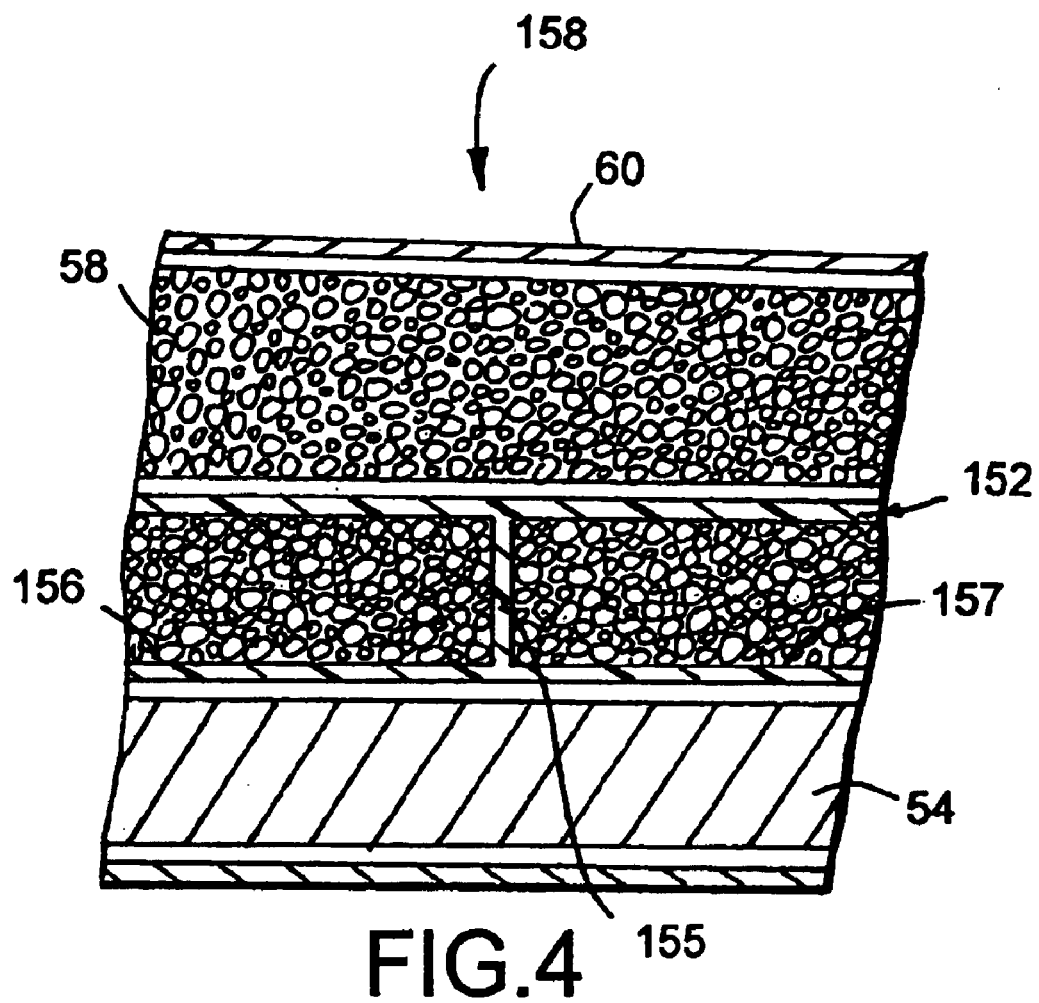
FIG. 4 is a cross-section of a third embodiment of the cushion of FIG. 2.

Referring now to FIG. 4, another embodiment of the seat cushion is shown in cross-section at 158. This seat cushion 158 is a modified version of the seat cushion 150 shown in FIG. 3. In the embodiment of FIG. 4, unless specifically described as different, the respective components of the seat cushion are the same as those described in connection with FIG. 3A, as previously discussed.

In the embodiment of FIG. 4, the seat cushion includes a centrally located pillow 152 between the reinforcement member 54 and the foam pad 58. The pillow 152, in this embodiment, is primarily made up of a single, sealed envelope with a central membrane 155 dividing the interior thereof into at least two separate chambers 156, 157, which are not in fluid communication with one another. Each of the chambers 156, 157 has a substantially inert gas therein. The chambers 156, 157 may contain only the inert gas, or alternatively, may also contain a flexible, resilient foamed elastomer therein, like the embodiment of FIG. 3B.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

Having, thus, described the invention, what is claimed is:

1. A seat cushion for use with a tree seat apparatus, said seat cushion comprising:
   a valveless, sealed envelope containing an entrapped gas;
   a layer of flexible, resilient foam above the scaled envelope and defining a top foam layer;
   a reinforcing member below the sealed envelope, said reinforcing member comprising a material which is denser than the foam of the top foam layer; and
   a protective outer layer substantially surrounding and enclosing the sealed envelope, the top foam layer, and the reinforcing member;
   wherein said envelope extends over an area which substantially covers said reinforcing member, wherein the reinforcing member is more than twice as thick as the outer layer.

2. The seat cushion of claim 1, wherein said outer layer comprises a fabric material.

3. The seat cushion of claim 1, wherein the reinforcing member comprises a resilient closed cell foam.

4. The seat cushion of claim 3, wherein the sealed envelope comprises at least two separate chambers.

5. The seat cushion of claim 1, wherein the sealed envelope comprises at least two separate chambers.

6. The tree seat apparatus of claim 1, wherein the sealed envelope has a flexible resilient foam material therein.

7. The tree seat apparatus of claim 1, wherein the sealed envelope is substantially horizontally coextensive with the top foam layer.

8. The seat cushion of claim 1, further comprising straps attached to the protective outer layer for removably attaching the cushion to a support member of a tree seat.

9. A tree seat apparatus, comprising
   a frame comprising a seat support member,
   an attachment member which is operatively connectable to the frame for removably attaching the frame to a tree, and
   a seat cushion for operatively attaching to said seat support member and comprising:
      a valveless sealed envelop, containing an entrapped gas;
      a layer of flexible, resilient foam above the sealed envelope and defining a top foam layer;
      a reinforcing member comprising a foam material, said reinforcing member being situated below the sealed envelope and formed from a foam which is denser than the top foam layer; and
      a protective outer layer covering the reinforcing member, the sealed envelope and the top foam layer;
      wherein the reinforcing member is more than twice as thick as the outer layer.

10. The tree seat apparatus of claim 9, wherein the seat cushion outer layer comprises a fabric material.

11. The tree seat apparatus of claim 9, wherein the seat cushion outer layer comprises a water-resistant liner.

12. The tree seat apparatus of claim 9, wherein the attachment member comprises at least one restraining device selected from the group consisting of belts, cables and chains.

13. The tree seat of claim 9, wherein the sealed envelope comprises at least two separate chambers.

14. A seat cushion for use with an outdoor seat apparatus, said seat cushion comprising:
   a valveless, sealed envelope containing an entrapped gas;
   a layer of flexible, resilient foam disposed above the sealed envelope and defining a top foam layer;
   a reinforcing member below the sealed envelope, said reinforcing member formed from a flexible, resilient foam which is denser than the foam of the top foam layer; and
   a protective outer layer substantially surrounding and enclosing the sealed envelope, the top foam layer, and the reinforcing member;
   wherein the sealed envelope, the reinforcing member and the top foam layer are all substantially horizontally coextensive with one another, wherein the reinforcing member is more than twice as thick as the outer layer.

15. The seat cushion of claim 14, further comprising straps attached to the protective outer layer for removably attaching the cushion to a support member of a tree seat.

* * * * *